(12) United States Patent
Tamura et al.

(10) Patent No.: US 12,078,344 B2
(45) Date of Patent: Sep. 3, 2024

(54) LEARNING DEVICE AND BOILER CONTROL SYSTEM

(71) Applicant: IHI Corporation, Koto-ku (JP)

(72) Inventors: Masato Tamura, Tokyo (JP); Shinji Watanabe, Tokyo (JP); Shun Inoue, Tokyo (JP); Isao Umoto, Tokyo (JP); Tomonori Matsubara, Tokyo (JP); Shinobu Nakamura, Tokyo (JP)

(73) Assignee: IHI Corporation, Koto-ku (JP)

( * ) Notice: Subject to any disclaimer, the term of this patent is extended or adjusted under 35 U.S.C. 154(b) by 445 days.

(21) Appl. No.: 17/426,966

(22) PCT Filed: Feb. 7, 2020

(86) PCT No.: PCT/JP2020/004864
§ 371 (c)(1),
(2) Date: Jul. 29, 2021

(87) PCT Pub. No.: WO2020/162607
PCT Pub. Date: Aug. 13, 2020

(65) Prior Publication Data
US 2022/0099289 A1 Mar. 31, 2022

(30) Foreign Application Priority Data
Feb. 8, 2019 (JP) .................................. 2019-021712

(51) Int. Cl.
*F22B 35/18* (2006.01)
*F22B 35/06* (2006.01)
(Continued)

(52) U.S. Cl.
CPC .............. *F22B 35/18* (2013.01); *F22B 35/06* (2013.01); *G06N 20/00* (2019.01); *H02J 3/004* (2020.01)

(58) Field of Classification Search
CPC ......... F22B 35/18; F22B 35/06; G06N 20/00; G06N 3/084; H02J 3/004; H02J 2203/20;
(Continued)

(56) References Cited

U.S. PATENT DOCUMENTS

2009/0132095 A1* 5/2009 Sekiai .................. G05B 13/027
    700/47
2017/0051681 A1  2/2017 Arias Chao et al.
2019/0377305 A1* 12/2019 Petrus .................... G05B 15/02

FOREIGN PATENT DOCUMENTS

JP         5-53605 A        3/1993
JP         H0553605 A  *   3/1993
(Continued)

OTHER PUBLICATIONS

International Search Report issued on Mar. 24, 2020 in PCT/JP2020/004864 filed on Feb. 7, 2020, 3 pages.

*Primary Examiner* — Chad G Erdman
(74) *Attorney, Agent, or Firm* — Oblon, McClelland, Maier & Neustadt, L.L.P.

(57) ABSTRACT

A learning device, for constructing a learning model for generating a prior acceleration command value for controlling a control target in advance of the time a load on a boiler used for thermal power generation changes, includes: a learner configured to generate the learning model by mechanically learning, as learning data, a data set including a power generation command value for the thermal power generation and the prior acceleration command value which have been used in a previous operation of the boiler.

8 Claims, 9 Drawing Sheets

(51) Int. Cl.
*G06N 20/00* (2019.01)
*H02J 3/00* (2006.01)

(58) Field of Classification Search
CPC ....... H02J 2300/10; H02J 3/003; Y02E 60/00; Y04S 10/50; Y04S 40/20
See application file for complete search history.

(56) References Cited

FOREIGN PATENT DOCUMENTS

| | | | |
|---|---:|---|---:|
| JP | 5-265507 | A | 10/1993 |
| JP | 6-195104 | A | 7/1994 |
| JP | 7-210208 | A | 8/1995 |
| JP | 9-145005 | A | 6/1997 |
| JP | 10-63307 | A | 3/1998 |
| JP | 10-228301 | A | 8/1998 |
| JP | 11-242503 | A | 9/1999 |
| JP | 2002-215205 | A | 7/2002 |
| JP | 2003-194301 | A | 7/2003 |
| JP | 2004-355329 | A | 12/2004 |
| JP | 2007-132630 | A | 5/2007 |
| JP | 2007-271187 | A | 10/2007 |
| JP | 2009-222332 | A | 10/2009 |
| JP | 2012-41889 | A | 3/2012 |
| JP | 2014-126305 | A | 7/2014 |
| JP | 2017-41253 | A | 2/2017 |

\* cited by examiner

LEARNING DEVICE AND BOILER CONTROL SYSTEM

TECHNICAL FIELD

The present disclosure relates to a learning device and a boiler control system.

Priority is claimed on Japanese Patent Application No. 2019-021712, filed Feb. 8, 2019, the content of which is incorporated herein by reference.

BACKGROUND ART

In the following Patent Document 1, a boiler control device used for a thermal power generation plant is disclosed. The boiler control device controls a boiler such that a power generation quantity E of the thermal power generation plant (a steam turbine) tracks a power generation command value MWD.

It is known that a response delay of a boiler is caused when a load on the boiler changes. Therefore, for example, the boiler control device may increase fuel of the boiler in advance based on, in addition to a power generation command value MWD, a prior acceleration command value referred to as a boiler input rate (BIR) when a load on the boiler changes such that the response delay is compensated for.

RELATED ART DOCUMENTS

Patent Document

[Patent Document 1]
Japanese Unexamined Patent Application, First Publication No. 2012-41889

SUMMARY

Technical Problem

However, the BIR needs to be set by a user on the basis of previous user's experience. Therefore, the accuracy of the BIR may be significantly affected by the user's experience, and there is a possibility that the above-described response delay will not be compensated for. As a result, a tracking characteristic of the power generation quantity E with respect to the power generation command value MWD may be low.

The present disclosure has been made in view of the above-described circumstances and an objective of the present disclosure is to improve a tracking characteristic of a power generation quantity with respect to a power generation command value.

Solution to Problem

According to a first aspect of the present disclosure, a learning device is provided for constructing a learning model for generating a prior acceleration command value for controlling a control target in advance of the time a load on a boiler used for thermal power generation changes, the learning device including: a learner configured to generate the learning model by mechanically learning, as learning data, a data set including a power generation command value for the thermal power generation and the prior acceleration command value which have been used in a previous operation of the boiler.

According to a second aspect of the present disclosure, in the learning device according to the first aspect, the learner causes a process value of the control target obtained in the previous operation of the boiler to be included in the learning data.

According to a third aspect of the present disclosure, in the learning device according to the second aspect, the process value of the control target includes one or more of a flow rate of fuel supplied to the boiler, a flow rate of water supplied to the boiler, a flow rate of air supplied to the boiler, a flow rate of ammonia for denitration, a flow rate of spray for controlling a reheated steam temperature, and steam pressure.

According to a fourth aspect of the present disclosure, in the learning device according to any one of the first to third aspects, the learner uses, as the learning data, the data set obtained in the previous operation of the boiler.

According to a fifth aspect of the present disclosure, in the learning device according to any one of the first to fourth aspects, the learner constructs, based on the learning data, the learning model which, by at least the power generation command value being input, outputs the prior acceleration command value in which a tracking characteristic of a power generation quantity E with respect to the power generation command value exceeds a given standard.

According to a sixth aspect of the present disclosure, in the learning device according to any one of the first to fourth aspects, the learner causes a power generation quantity of the thermal power generation obtained in the previous operation of the boiler to be included in the data set.

According to a seventh aspect of the present disclosure, in the learning device according to the sixth aspect, the learner constructs, based on the learning data, the learning model which, by at least the power generation command value and the prior acceleration command value being input, outputs the power generation quantity.

According to an eighth aspect of the present disclosure, a boiler control system is provided including: the learning device according to the fifth aspect; and a boiler control device configured to obtain the prior acceleration command value by inputting at least the power generation command value to a learned model which is the learning model constructed by the learning device, wherein, when the load on the boiler changes, the boiler control device causes the power generation quantity to track the power generation command value by controlling the control target based on a value obtained by adding the prior acceleration command value to the power generation command value.

According to a ninth aspect of the present disclosure, a boiler control system is provided including: the learning device according to the seventh aspect; and a boiler control device configured to obtain the power generation quantity by inputting at least the power generation command value to a learned model which is the learning model constructed by the learning device, wherein the boiler control device obtains the prior acceleration command value in which a deviation between the power generation command value input to the learned model and the power generation quantity output from the learned model is minimized.

Effects of the Invention

As described above, according to the present disclosure, it is possible to improve a tracking characteristic of a power generation quantity with respect to a power generation command value.

DETAILED DESCRIPTION

Hereinafter, a learning device and a boiler control system according to a first embodiment will be described with reference to the drawings.

First Embodiment

Figure 1:
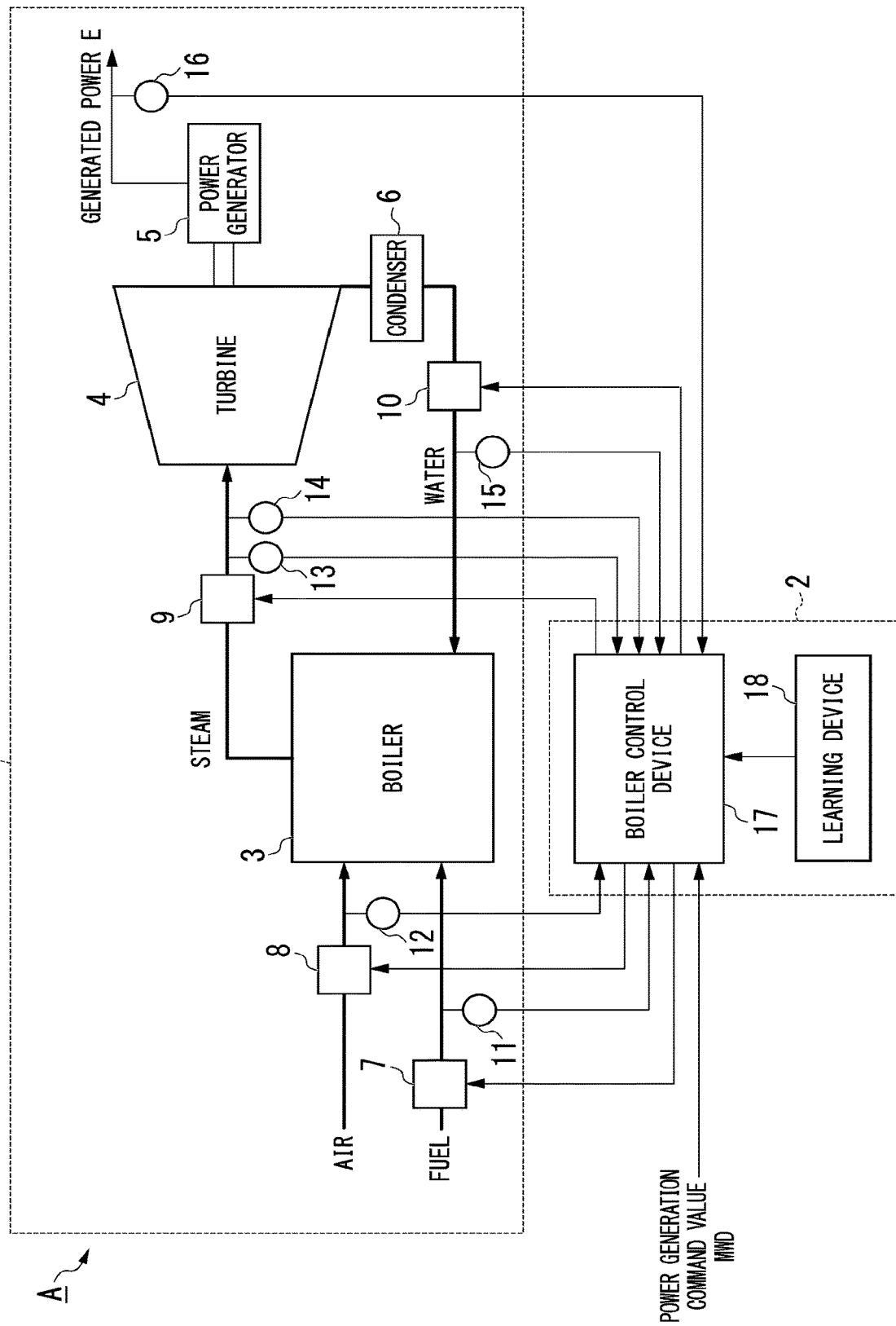
FIG. 1 is a diagram showing an example of a schematic configuration of a thermal power generation system according to a first embodiment.

FIG. 1 is a diagram showing an example of a schematic configuration of a thermal power generation system A according to the first embodiment. As shown in FIG. 1, the thermal power generation system A includes a thermal power generation plant 1 and a plant control system 2.

The thermal power generation plant 1 causes steam to be generated by the boiler 3 with the heat of combustion gas generated by burning fuel. The thermal power generation plant 1 drives a steam turbine 4 with the steam, and a power generator 5 directly connected to the steam turbine 4 obtains a desired power generation quantity E.

The plant control system 2 controls the boiler 3 and therefore controls the power generation quantity E generated by the power generator 5. Here, controlling the boiler 3 means controlling a parameter (hereinafter referred to as a "control target") necessary for operating the boiler 3. For example, the control target is one or more of a flow rate of fuel that is supplied to the boiler 3 (hereinafter referred to as a "fuel flow rate"), a flow rate of water that is supplied to the boiler 3 (hereinafter referred to as a "water supply flow rate"), a flow rate of air that is supplied to the boiler 3 (hereinafter referred to as an "air flow rate"), the pressure of steam supplied from the boiler 3 to the steam turbine 4 (hereinafter referred to as "main steam pressure"), a temperature of the steam supplied from the boiler 3 to the steam turbine 4 (hereinafter referred to as a "main steam temperature"), a flow rate of ammonia for denitration, and a flow rate of spray for controlling a reheated steam temperature (hereinafter referred to as a "spray flow rate for controlling reheated steam temperature").

The schematic configuration of the thermal power generation plant 1 according to the first embodiment will be described below with reference to FIG. 1.

The thermal power generation plant 1 includes the boiler 3, the steam turbine 4, the power generator 5, a condenser 6, a fuel flow rate adjuster 7, an air flow rate adjuster 8, a steam flow rate adjuster 9, a water supply pump 10, a fuel flow rate sensor 11, an air flow rate sensor 12, a pressure sensor 13, a temperature sensor 14, a water supply flow rate sensor 15, and an electric power sensor 16.

The boiler 3 generates combustion gas by taking in outside air and fuel such as pulverized coal and burning the fuel. The boiler 3 heats water with the heat of the combustion gas to generate steam and supplies the steam to the steam turbine 4. Here, the pulverized coal is fuel obtained by crushing coal.

Also, although a case in which the fuel is coal (for example, pulverized coal) will be described in the first embodiment, the fuel is not limited thereto. For example, the fuel may be petroleum such as heavy oil or light oil, liquefied natural gas (LNG), liquefied petroleum gas (LPG), natural gas such as methane hydrate or shale gas, or biomass.

The steam turbine 4 is directly connected to the power generator 5. That is, an output shaft of the steam turbine 4 is connected to a rotating shaft of the power generator 5. The steam turbine 4 is rotated by the steam generated in the boiler 3 and causes the power generator 5 to rotate.

The power generator 5 is driven through the rotation of the steam turbine 4 and performs power generation.

The condenser 6 cools the steam to restore the water after the steam turbine 4 is rotated.

The fuel flow rate adjuster 7 is controlled by the plant control system 2 and adjusts the flow rate of fuel that is supplied to the boiler 3. For example, the fuel flow rate adjuster 7 is a flow rate adjustment valve and adjusts the flow rate of fuel that is supplied to the boiler 3 when a degree of opening thereof is controlled by the plant control system 2.

The air flow rate adjuster 8 is controlled by the plant control system 2 and adjusts the flow rate of air that is supplied to the boiler 3. For example, the air flow rate adjuster 8 is a flow rate adjustment valve or a damper and adjusts the flow rate of air that is supplied to the boiler 3 when a degree of opening thereof is controlled by the plant control system 2. Here, the air may be primary air, secondary air, or both.

The steam flow rate adjuster 9 is controlled by the plant control system 2 and adjusts the flow rate of steam that is supplied from the boiler 3 to the steam turbine 4. For example, the steam flow rate adjuster 9 is a flow rate adjustment valve and adjusts the flow rate of steam that is supplied from the boiler 3 to the steam turbine 4 when a degree of opening thereof is controlled by the plant control system 2.

The water supply pump 10 supplies the water restored by the condenser 6 to the boiler 3. The driving of the water supply pump 10 is controlled by the plant control system 2. Therefore, the flow rate of water that is supplied from the water supply pump 10 to the boiler 3 is controlled by the plant control system 2.

The fuel flow rate sensor 11 measures the flow rate of fuel that is supplied to the boiler 3 and outputs the measured fuel flow rate to the plant control system 2.

The air flow rate sensor 12 measures the flow rate of air that is supplied to the boiler 3 and outputs the measured air flow rate to the plant control system 2.

The pressure sensor 13 measures the pressure of steam that is supplied from the boiler 3 to the steam turbine 4 and outputs the measured steam pressure to the plant control system 2.

The temperature sensor 14 measures the main steam temperature, which is the temperature of the steam supplied from the boiler 3 to the steam turbine 4, and outputs the measured main steam temperature to the plant control system 2.

The water supply flow rate sensor 15 measures the flow rate of water that is supplied to the boiler 3 and outputs the measured water supply flow rate to the plant control system 2.

The electric power sensor 16 measures the power generation quantity E generated by the power generator 5 and outputs the measured power generation quantity E to the plant control system 2.

Next, a schematic configuration of the plant control system 2 according to the first embodiment will be described.

The plant control system 2 includes a boiler control device 17 and a learning device 18. Also, although an example in which the boiler control device 17 and the learning device 18 are separately configured will be described in the first embodiment, the present disclosure is not limited thereto. The boiler control device 17 and the learning device 18 may be integrally configured. For example, the information processing device may have a function of the boiler control device 17 and a function of the learning device 18. The information processing device is, for example, a computer.

Also, each of the boiler control device 17 and the learning device 18 may include a microprocessor such as a central processing unit (CPU) or a micro processing unit (MPU), a microcontroller such as a micro controller unit (MCU), or the like.

The information processing device having the function of the boiler control device 17 and the function of the learning device 18 may include a CPU, a memory such as a random access memory (RAM) or a read only memory (ROM), a storage device such as a solid state drive (SSD) or a hard disk drive (HDD), and an input/output device that exchanges signals with an external device such as a sensor.

The boiler control device 17 controls each control target on the basis of a power generation command value MWD (Mega Watt Demand), which is a command value of an output of the thermal power generation (the power generator 5), such that the power generation quantity E is allowed to track the power generation command value MWD.

The power generation command value MWD is a target value of the power generation quantity E generated by the power generator 5. The boiler control device 17 may acquire the power generation command value MWD from an external device or may calculate the power generation command value MWD using the well-known technology.

Here, it is known that a response delay of the boiler 3 is caused when the load on the boiler 3 changes. Therefore, for example, the boiler control device 17 performs prior control for increasing the fuel of the boiler 3, in advance of the time the load on the boiler 3 changes, based on, in addition to the power generation command value MWD, a prior acceleration command value called a boiler input rate (BIR) (hereinafter referred to as a "prior acceleration command BIR") such that the above-described response delay is compensated for.

Figure 2:
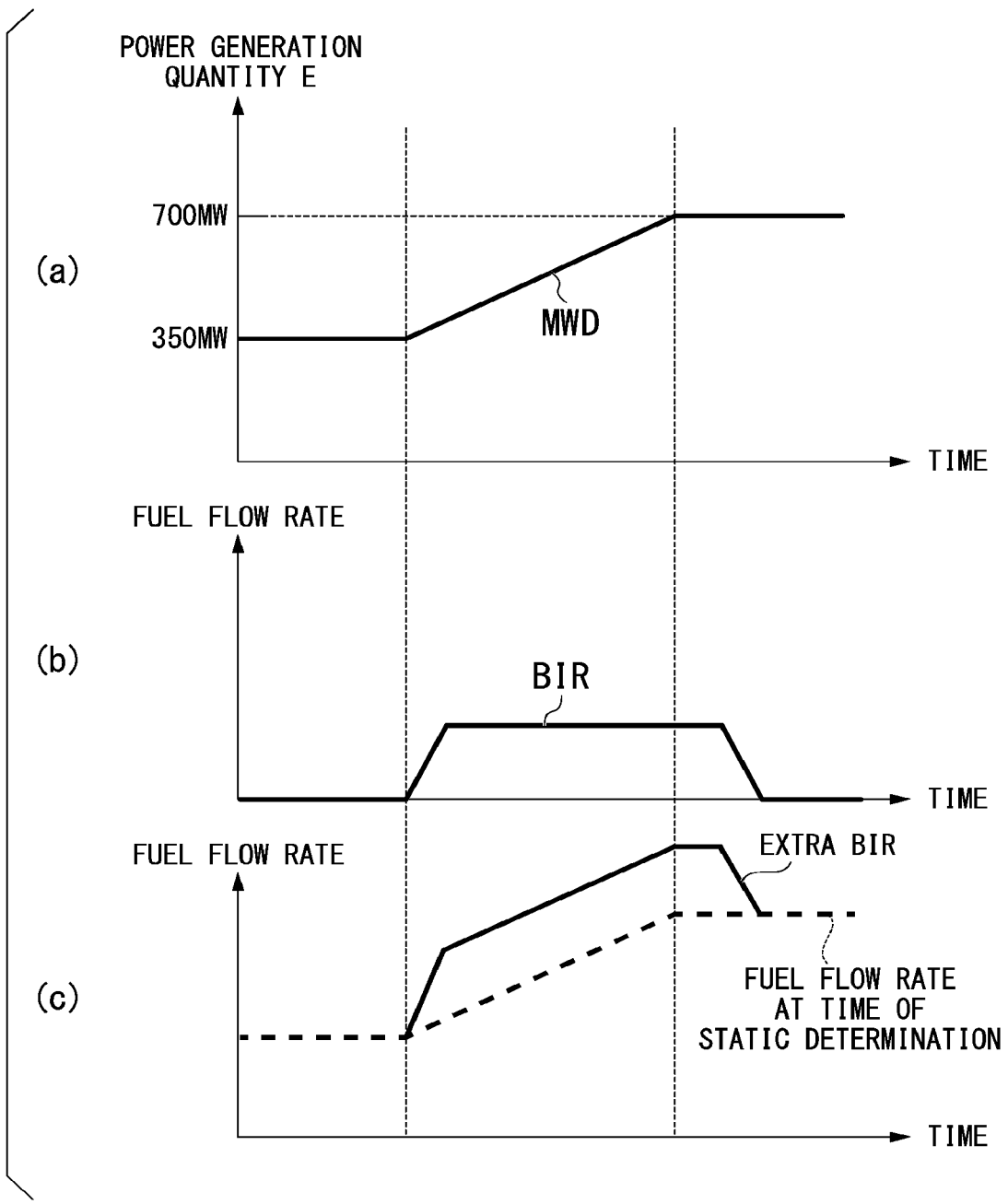
FIG. 2 is a diagram for describing a prior acceleration command value BIR.

As shown in FIG. 2, for example, a case in which the thermal power generation plant 1 according to the first embodiment is a coal-fired power generation plant of 700 MW and the power generation quantity E of the power generator 5 is increased from 350 MW to 700 MW as a change in the load is assumed. As a static characteristic of the boiler 3, it is assumed that a fuel of 110 t/h to 220 t/h is required as fuel consumption (a fuel flow rate) such that the power generation quantity E is increased from 350 MW to 700 MW.

In this case, when the boiler control device 17 controls the fuel flow rate from 110 t/h to 220 t/h at once such that the power generation quantity E is increased from 350 MW to 700 MW, the driving of a plurality of devices (for example, a device for crushing coal) may not be able to track the increase of the power generation quantity E. Therefore, the boiler control device 17 does not raise the power generation quantity E from 350 MW to 700 MW at once, but raises the power generation quantity E at a certain rate of change. That is, when there is a load change from a first power generation quantity to a second power generation quantity, the power generation command value MWD becomes a power generation command value indicating that the power generation quantity is increased from the first power generation quantity to the second power generation quantity at a certain rate of change (FIG. 2(*a*)). On the other hand, there is a user's request to accelerate this load change. Therefore, as shown in FIG. 2(*c*), the boiler control device 17 performs prior control for increasing control target at the time of a static determination in advance when the load on the boiler 3 changes. Specifically, the boiler control device 17 increases the control target in advance based on the prior acceleration command value BIR shown in FIG. 2(*b*).

FIG. 2(*a*) is a diagram showing a relationship between the time and the power generation quantity when the power generation quantity is increased at a certain rate of change, FIG. 2(*b*) is a diagram showing a relationship between the time and the fuel flow rate when only the prior acceleration command value BIR is applied, and FIG. 2(*c*) shows a relationship between the time and the fuel flow rate when a fuel flow rate based on the BIR is added to the fuel flow rate at the time of static determination (the fuel flow rate when the power generation quantity is increased at the change rate shown in FIG. 2(*a*)).

In the first embodiment, an example of prior control in which the fuel flow rate is increased in advance as prior control of the main steam temperature in the boiler control device 17 will be described. However, the prior control of the boiler control device 17 is not limited to the above example and the water supply flow rate may be controlled in advance as the prior control of the main steam pressure. Further, the boiler control device 17 may control the air flow rate in advance. For example, the boiler control device 17 may perform prior control on at least one of the above-described control targets.

Here, one of the features of the present embodiment is that the boiler control device 17 uses the prior acceleration command value BIR generated by the learning device 18 using a learning model (a learned model) constructed according to machine learning for the prior control. Also, in the following description, a process of constructing the learning model may be referred to as a learning process and a process of generating the prior acceleration command value BIR using the learned model may be referred to as a control process.

The learning device 18 constructs a learning model for generating the prior acceleration command value BIR used for the prior control.

Figure 3:
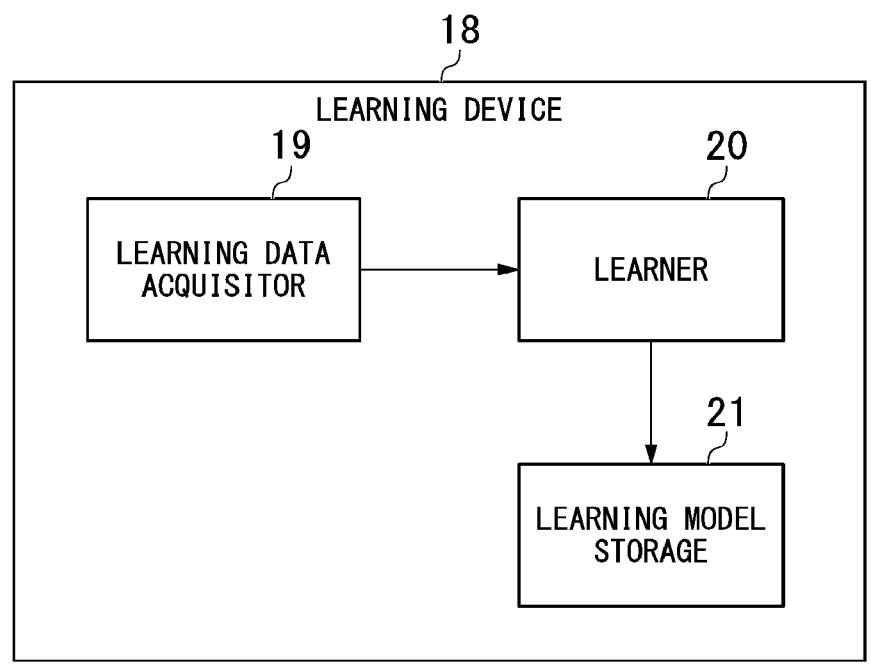
FIG. 3 is a functional block diagram of a learning device according to the first embodiment.

First, functional blocks of the learning device 18 according to the first embodiment will be described with reference to FIG. 3. FIG. 3 is a functional block diagram of the learning device 18 according to the first embodiment.

As shown in FIG. 3, the learning device 18 includes a learning data acquisitor 19, a learner 20, and a learning model storage 21.

The learning data acquisitor 19 acquires previous operation data of the boiler 3 as learning data. The operation data is at least one of data necessary for the operation of the boiler 3 and data indicating a state of the boiler in the operation or may include both data. For example, this operation data is the power generation command value MWD, the prior acceleration command value BIR, the power generation quantity E, and the process value of the control target. The process value of the control target is, for example, one or more of the fuel flow rate, the water supply flow rate, the air flow rate, the main steam pressure, the ammonia flow rate for denitration, the spray flow rate for controlling reheated steam temperature, and the main steam temperature.

Specifically, the learning data acquisitor 19 acquires a data set including the power generation command value MWD and the prior acceleration command value BIR used in the previous operation of the boiler 3 as learning data. Also, the learning data acquisitor 19 may include the power generation quantity E or the process value of the control target obtained in the previous operation of the boiler 3 in the above-described data set.

Further, the learning data acquisitor 19 may extract a data set when a deviation between the power generation command value MWD used in a previous operation of the boiler 3 and the power generation quantity E obtained through the previous operation of the boiler 3 within the previous operation data of the boiler 3 (hereinafter referred to as a "power generation deviation quantity") is less than or equal to a threshold value as learning data. The data set when the power generation deviation quantity is less than or equal to the threshold value is a data set when a tracking characteristic of the power generation quantity E with respect to the power generation command value MWD exceeds a given standard. Also, the above-described threshold value may be set in accordance with a value allowed as the power generation deviation quantity during an actual operation of the boiler 3.

As described above, the learning data acquisitor 19 may have an evaluation function of evaluating the tracking characteristic of the power generation quantity E with respect to the power generation command value MWD and may extract operation data, when the evaluation of the tracking characteristic exceeds a given standard, as the learning data. However, it is not essential for the learning data acquisitor 19 to use the operation data as the learning data when the evaluation of the tracking characteristic exceeds the given standard and operation data may be extracted as the learning data when the evaluation of the tracking characteristic does not exceed the given standard. That is, the learning data acquisitor 19 may use all operation data as the learning data regardless of the tracking characteristic of the power generation quantity E with respect to the power generation command value MWD. For example, the learning data acquisitor 19 may use a set of operation data when the evaluation of the tracking characteristic of the operation data exceeds the given standard and a correct answer label indicating that the tracking characteristic of the operation data is good as the learning data. Also, the learning data acquisitor 19 may use a set of operation data when the evaluation of the tracking characteristic of the operation data does not exceed the given standard and a correct answer label indicating that the tracking characteristic of the operation data is bad as the learning data.

Also, the above-described previous operation may be a test operation of the boiler that has previously been performed, an actual operation of the boiler that has previously been performed, or both. Also, the learning data acquisitor 19 may acquire the power generation quantity E from the electric power sensor 16.

Also, the learning data acquisitor 19 may acquire the above-described operation data as learning data from the boiler control device 17 or may directly acquire the above-described operation data from the above-described various types of sensors (the fuel flow rate sensor 11, the air flow rate sensor 12, the pressure sensor 13, the temperature sensor 14, the water supply flow rate sensor 15, and the like). Further, the learning data acquisitor 19 may acquire the operation data by reading, as learning data, the operation data stored in a storage (not shown) provided outside or inside the learning device 18.

As described above, the learning data acquisitor 19 acquires, as learning data, a data set including the power generation command value MWD and the prior acceleration command value BIR from the operation data.

The learner 20 constructs a learning model for generating the prior acceleration command value BIR by performing machine learning on the basis of the learning data acquired by the learning data acquisitor 19. It is only necessary for the learning model to, by at least the power generation command value MWD being input, output the prior acceleration command value BIR in which the tracking characteristic of the power generation quantity E with respect to the power generation command value MWD exceeds a given standard, and the present disclosure is not particularly limited to a type of machine learning. For example, the machine learning may be supervised learning such as a support vector machine (SVM) or may be reinforcement learning. Also, the machine learning may be machine learning using a neural network, or may be, for example, deep learning.

For example, the learner 20 uses, within the learning data (the data set), the power generation command value MWD serving as input data and the prior acceleration command value BIR serving as the correct answer data of the input value. The learner 20 learns a parameter (a weight) of the learning model such that the deviation between the output value output from the learning model and the correct answer data is minimized by inputting the input value into the learning model. Also, the process value of the control target may be used as the input value. The process value is, for example, one or more of the fuel flow rate, the water supply flow rate, the air flow rate, the main steam pressure, the ammonia flow rate for denitration, the spray flow rate for controlling reheated steam temperature, and the main steam temperature.

As described above, the learner 20 determines a weight for generating or predicting the prior acceleration command value BIR in which the tracking characteristic of the power generation quantity E with respect to the power generation command value MWD exceeds the given standard. For example, the learner 20 determines a weight co indicating an influence of a predetermined explanatory variable on an objective variable. In this case, the explanatory variable is the power generation command value MWD or the process value of the control target. Also, the objective variable is the prior acceleration command value BIR.

The learning model storage 21 stores the learning model constructed by the learner 20.

For example, the learning model storage 21 includes a hard disk drive (HDD), a non-volatile memory, or the like.

Figure 4:
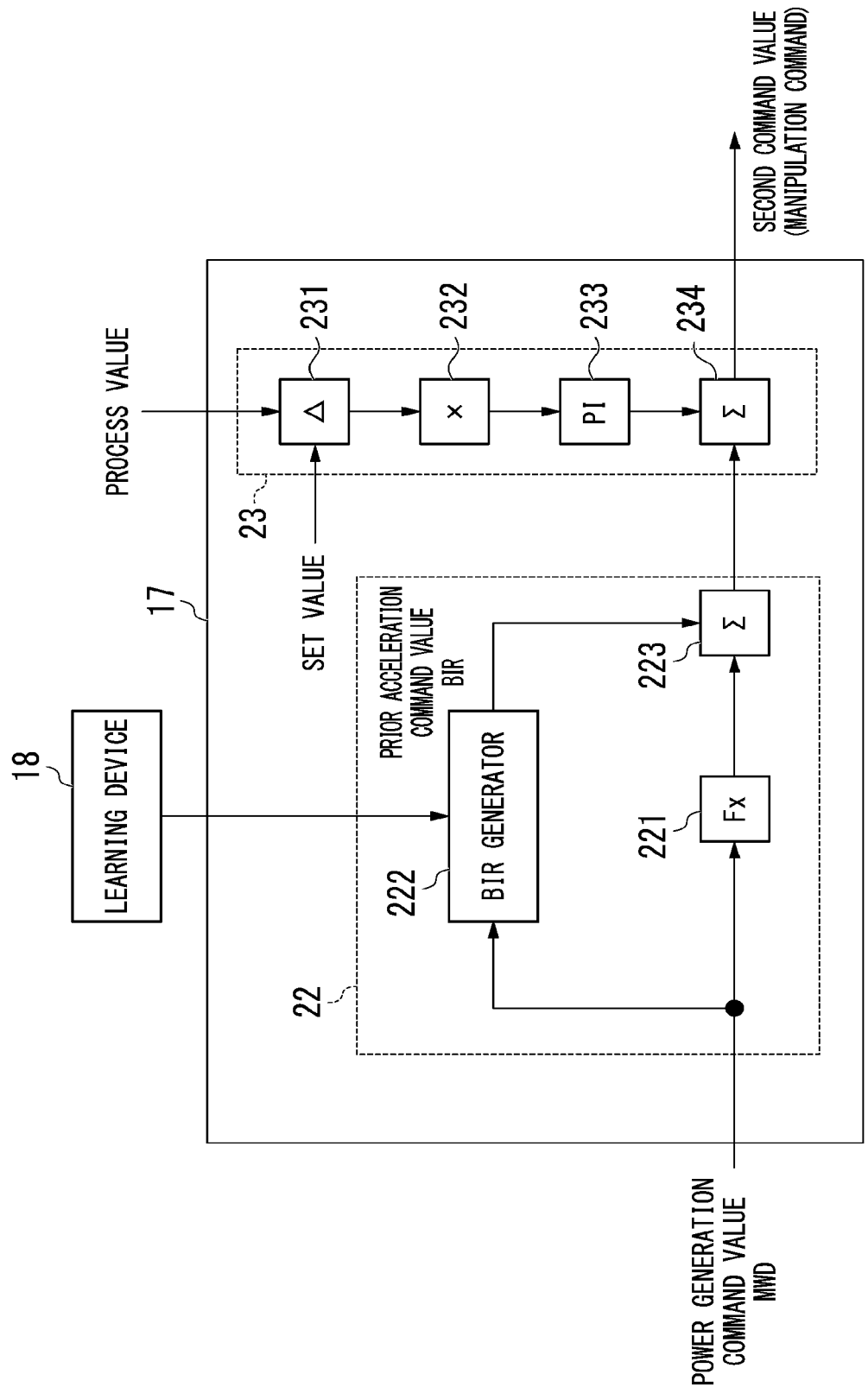
FIG. 4 is a functional block diagram of a boiler control device according to the first embodiment.

Next, the functional blocks of the boiler control device 17 when the load on the boiler 3 according to the first embodiment changes will be described with reference to FIG. 4. FIG. 4 is a functional block diagram of the boiler control device 17 according to the first embodiment.

As shown in FIG. 4, the boiler control device 17 includes a prior controller 22 and a feedback controller 23. Also, although an example in which the boiler control device 17 controls the fuel flow rate in advance will be described in the first embodiment, the example can be similarly applied to a case in which other control targets such as the main steam temperature, the water supply flow rate, the main steam pressure, and the air flow rate are controlled in advance. Also, functions of all or part of the above-described boiler control device 17 may be implemented by recording a program for implementing the functions in a computer in the above-described computer-readable recording medium and causing the above-described processor to read and execute the above-described program recorded in the recording medium.

The prior controller 22 includes a function generator 221, a BIR generator 222, and an adder 223.

The function generator 221 acquires the power generation command value MWD. Then, the function generator 221 converts the power generation command value MWD into a command value of a fuel flow rate (hereinafter referred to as a "fuel flow rate command value") according to a preset function. The function generator 221 outputs the converted fuel flow rate command value to the adder 223.

The BIR generator 222 acquires a learning model (a learned model) constructed by the learning device 18 from the learning device 18. For example, the BIR generator 222 reads the learned model stored in the learning model storage 21. The BIR generator 222 obtains the prior acceleration command value BIR from the learned model by inputting the power generation command value MWD to the read learned model. For example, the BIR generator 222 acquires the prior acceleration command value BIR from the learning model before the load on the boiler 3 actually changes. The BIR generator 222 outputs the prior acceleration command value BIR obtained from the learned model to the adder 223.

Also, the BIR generator 222 may obtain the prior acceleration command value BIR from the learning model by inputting the power generation command value MWD and a current process value (for example, a current fuel flow rate, a main steam temperature, or both) to the read learned model. For example, when the read learned model has been learned using the process value, the BIR generator 222 may obtain the prior acceleration command value BIR from the learning model by inputting the current value of the process value to the above-described learned model in addition to the power generation command value MWD.

The adder 223 generates a first command value by adding the fuel flow rate command value, which is output from the function generator 221, to the prior acceleration command value BIR output from the BIR generator 222. The adder 223 outputs the generated first command value to the feedback controller 23.

The feedback controller 23 includes a subtractor 231 and a multiplier 232, a PI controller 233, and an adder 234.

For example, the subtractor 231 obtains a deviation ΔH between the main steam pressure measured by the pressure sensor 13 as the process value of the control target and a preset set value of the process value.

The multiplier 232 multiplies the deviation ΔH obtained by the subtractor 231 by a coefficient K set by the power generation command value MWD or the like. The multiplier 232 outputs, to the PI controller 233, a value (ΔH×K) obtained by multiplying the deviation ΔH by the coefficient K.

The PI controller 233 generates a control command for eliminating the value (ΔH×K) by applying PI control to the value (ΔH×K) output from the multiplier 232. The PI controller 233 outputs the generated control command to the adder 234.

The adder 234 generates a second command value by adding the control command, which is output from the PI controller 233, to the first command value output from the adder 223. This second command value is a manipulation command for controlling the control target. The adder 234 outputs the second command value to a device for controlling the control target, for example, the fuel flow rate adjuster 7.

Figure 5:
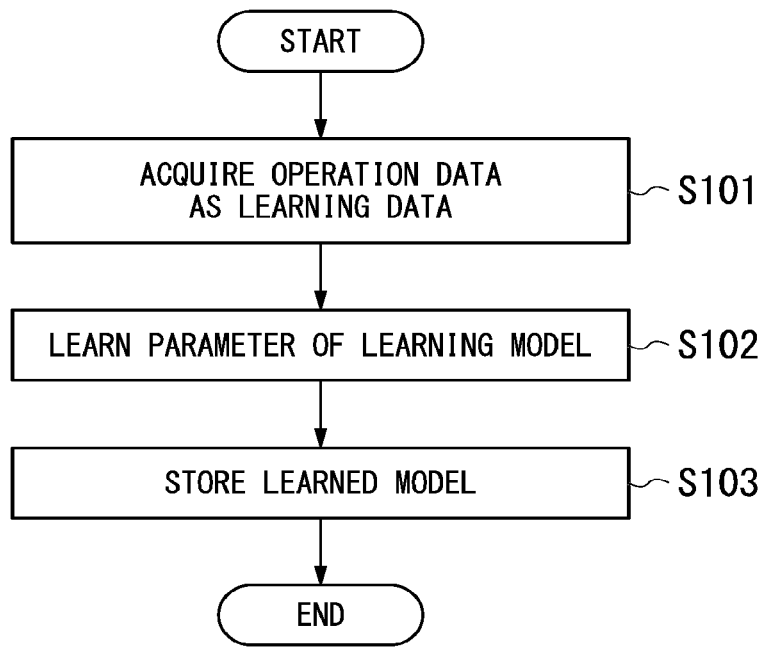
FIG. 5 is a flowchart of an example of an operation of the learning device according to the first embodiment.

Next, an example of a flow of an operation of the learning device 18 according to the first embodiment will be described with reference to FIG. 5. FIG. 5 is a flowchart of an example of the operation of the learning device 18 according to the first embodiment.

First, the learning data acquisitor 19 acquires previous operation data of the boiler 3 as learning data (step S101). Here, as an example, the learning data acquisitor 19 may extract, as the learning data from the previous operation data of the boiler 3, operation data in which the tracking characteristic of the power generation quantity E with respect to the power generation command value MWD exceeds a standard. For example, the learning data acquisitor 19 extracts, as learning data from the previous operation data obtained for each control cycle of the boiler control device 17, operation data when a power generation deviation quantity is less than or equal to a threshold value. Thereby, the learning data acquisitor 19 can extract, as learning data, operation data in which the tracking characteristic exceeds the standard. Also, for example, the operation data includes the power generation command value MWD, the prior acceleration command value BIR, and the process value (for example, the process value is one or more of the fuel flow rate, the water supply flow rate, the air flow rate, the main steam pressure, the ammonia flow rate for denitration, the spray flow rate for controlling reheated steam temperature, and the main steam temperature).

However, the learning data acquisitor 19 may also extract, as the learning data from the previous operation data of the boiler 3, operation data in which the tracking characteristic of the power generation quantity E with respect to the power generation command value MWD does not exceed the standard.

Next, the learner 20 acquires an output value from the learning model by inputting the power generation command value MWD and the process value as input values to the learning model. The learner 20 learns a parameter (a weight) of the learning model using, for example, an error back-propagation method, such that the deviation between the output value from the learning model and the prior acceleration command value BIR of the learning data is minimized (step S102).

The learner 20 stores the constructed learning model (learned model) in the learning model storage 21 (step S103).

As described above, the learning device 18 of the above-described embodiment includes the learner 20 for constructing the learning model for generating a prior acceleration command value BIR for controlling a control target in advance of the time the load on the boiler 3 used for thermal power generation changes. The learner 20 generates the above-described learning model by mechanically learning, as learning data, the data set including the power generation command value MWWD of the thermal power generation and the prior acceleration command value BIR used in the previous operation of the boiler 3.

According to the above-described configuration, it is possible to generate a prior acceleration command value BIR in which the above-described tracking characteristic exceeds a given standard in a state in which the user does not set the prior acceleration command value BIR based on previous experience. Therefore, it is possible to improve the tracking characteristic of the power generation quantity E with respect to the power generation command value MWD.

Further, the operation data in the actual operation using the prior acceleration command value BIR obtained from the learning model of the above-described first embodiment is utilized as the learning data. As a result, the learning device 18 can accurately generate the prior acceleration command value BIR in which the above-described tracking characteristic exceeds the given standard when the actual operation is performed.

Second Embodiment

A thermal power generation system B according to a second embodiment will be described below. The thermal power generation system B according to the second embodiment is different from the thermal power generation system A according to the first embodiment in that a method of generating the prior acceleration command value BIR is different. The same or similar parts may be designated by the same reference signs in the drawings and redundant description thereof will be omitted.

Figure 6:
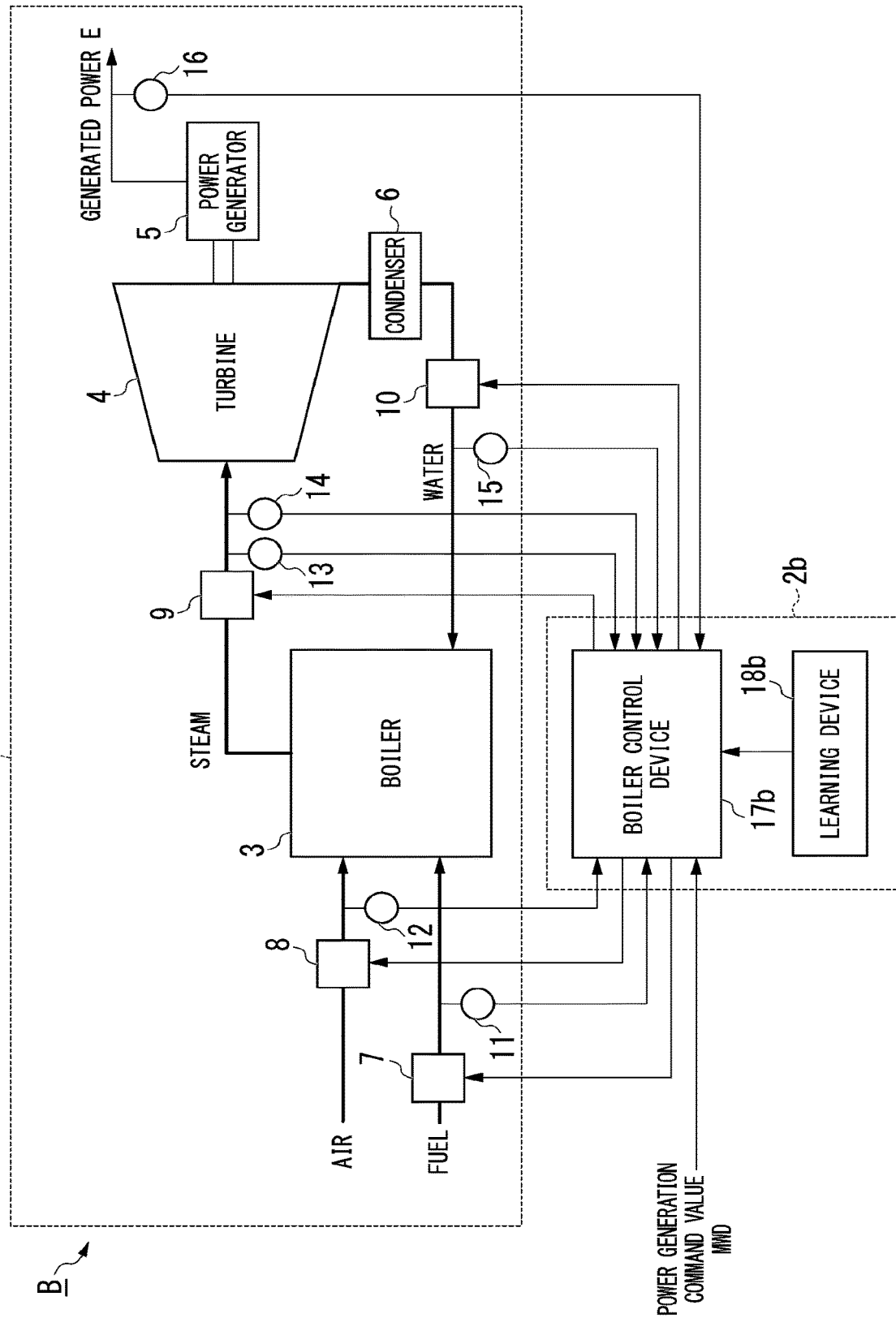
FIG. 6 is a diagram showing an example of a schematic configuration of a thermal power generation system according to a second embodiment.

FIG. 6 is a diagram showing an example of a schematic configuration of the thermal power generation system B according to the second embodiment. As shown in FIG. 6, the thermal power generation system B includes a thermal power generation plant 1 and a plant control system 2b.

The plant control system 2b controls a boiler 3 and therefore controls a power generation quantity E generated by a power generator 5. Here, controlling the boiler 3 means controlling a control target, which is a parameter necessary for operating the boiler 3. This control target is similar to that of the first embodiment.

Next, a schematic configuration of the plant control system 2b according to the second embodiment will be described.

The plant control system 2b includes a boiler control device 17b and a learning device 18b. Also, although an example in which the boiler control device 17b and the learning device 18b are separately configured will be described in the second embodiment, the present disclosure is not limited thereto. The boiler control device 17b and the learning device 18b may be integrally configured as in the first embodiment. For example, the information processing device may have the function of the boiler control device 17b and the function of the learning device 18b.

Also, each of the boiler control device 17b and the learning device 18b may include a microprocessor such as a CPU or an MPU, a microcontroller such as an MCU, or the like.

The boiler control device 17b controls each control target on the basis of the power generation command value MWD, which is the command value of the output of the thermal power generation (the power generator 5) and therefore causes the power generation quantity E to track the power generation command value MWD. This power generation command value MWD is a target value of the power generation quantity E generated by the power generator 5. The boiler control device 17b may acquire the power generation command value MWD from an external device or may calculate the power generation command value MWD using the well-known technology.

When the load on the boiler 3 changes, for example, the boiler control device 17b performs prior control for increasing the fuel of the boiler in advance based on the prior acceleration command value BIR. Also, an example of a prior control in which the fuel flow rate is increased in advance, as prior control of the main steam temperature in the boiler control device 17b of the second embodiment as in the first embodiment, will be described. However, the prior control of the boiler control device 17b is not limited to the above example and the water supply flow rate may be controlled in advance as the prior control of the main steam pressure. Further, the boiler control device 17b may control the air flow rate in advance.

The learning device 18b constructs a learning model for generating a prior acceleration command value BIR used for the prior control.

Figure 7:
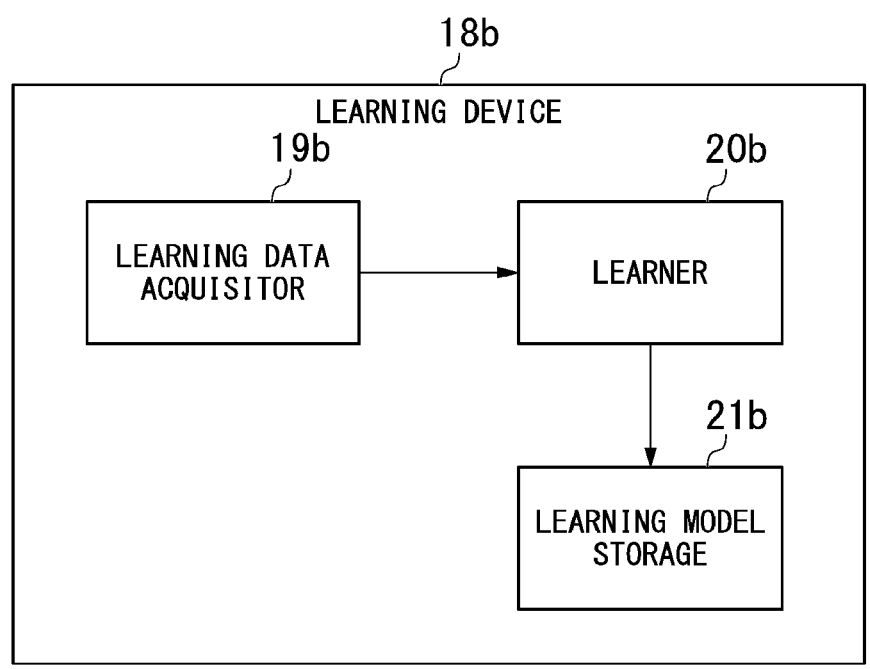
FIG. 7 is a functional block diagram of a learning device according to the second embodiment.

First, functional blocks of the learning device 18b according to the second embodiment will be described with reference to FIG. 7. FIG. 7 is a functional block diagram of the learning device 18b according to the second embodiment.

As shown in FIG. 7, the learning device 18b includes a learning data acquisitor 19b, a learner 20b, and a learning model storage 21b.

The learning data acquisitor 19b acquires, as learning data, the previous operation data of the boiler 3 and the power generation quantity E obtained through the previous operation when the previous operation data of the boiler 3 is acquired. For example, the learning data acquisitor 19b acquires the operation data and the power generation quantity E for each control cycle of the boiler control device 17b. This operation data is similar to that of the first embodiment. Specifically, the learning data acquisitor 19b acquires, as the learning data, a data set of the operation data including the power generation command value MWD and the prior acceleration command value BIR used in the previous operation of the boiler 3 and the power generation quantity E obtained through the previous operation.

The learning data acquisitor 19b may acquire the above-described learning data from the boiler control device 17b at regular intervals or may directly acquire the above-described learning data from the above-described various types of sensors (the fuel flow rate sensor 11, the air flow rate sensor 12, the pressure sensor 13, the temperature sensor 14, the water supply flow rate sensor 15, the electric power sensor 16, and the like) at regular intervals. Further, the learning data acquisitor 19b may read and acquire, as learning data, the operation data and the power generation quantity E which are stored in a storage (not shown) provided outside or inside the learning device 18b and are associated with each other.

The learner 20b constructs a learning model for generating the prior acceleration command value BIR by performing machine learning based on the learning data acquired by the learning data acquisitor 19b. For example, the learner 20b mechanically learns the characteristics of the boiler 3 based on the learning data acquired by the learning data acquisitor 19b.

For example, the learner 20b causes a learning model of deep learning, a neural network, or the like to learn relationships between the power generation command value MWD, the prior acceleration command value BIR, and the power generation quantity E based on the learning data acquired by the learning data acquisitor 19*b*. That is, the learner 20*b* constructs a learning model in which the power generation quantity E is output when the power generation command value MWD and the prior acceleration command value BIR are input in the control process. As an example, the learner 20*b* constructs the above-described learning model by learning a parameter (a weight) of the learning model using, for example, an error backpropagation method, such that a deviation between an output value and the power generation quantity E is minimized, the output value being output by the power generation command value MWD and the prior acceleration command value BIR within the learning data being input as input data to the learning model, and the power generation quantity E being the learning data.

However, the learner 20*b* according to the present embodiment is not limited to the above embodiment and may cause the learning model to mechanically learn relationships between the power generation command value MWD, the prior acceleration command value BIR, the process value, and the power generation quantity E based on the learning data acquired by the learning data acquisitor 19*b*. That is, the learner 20*b* may construct a learning model by machine learning in which the power generation quantity E is output when the power generation command value MWD, the prior acceleration command value BIR, and the process value are input in the control process. As an example, the learner 20*b* may construct the above-described learning model by mechanically learning a parameter (a weight) of the learning model using, for example, an error backpropagation method, such that a deviation between an output value and the power generation quantity E is minimized, the output value being output by the power generation command value MWD, the prior acceleration command value BIR, and the process value within the learning data being input as input data to the learning model, and the power generation quantity E being the learning data.

The learning model storage 21*b* stores the learning model constructed by the learner 20*b*. For example, the learning model storage 21*b* includes an HDD, a non-volatile memory, or the like.

Figure 8:
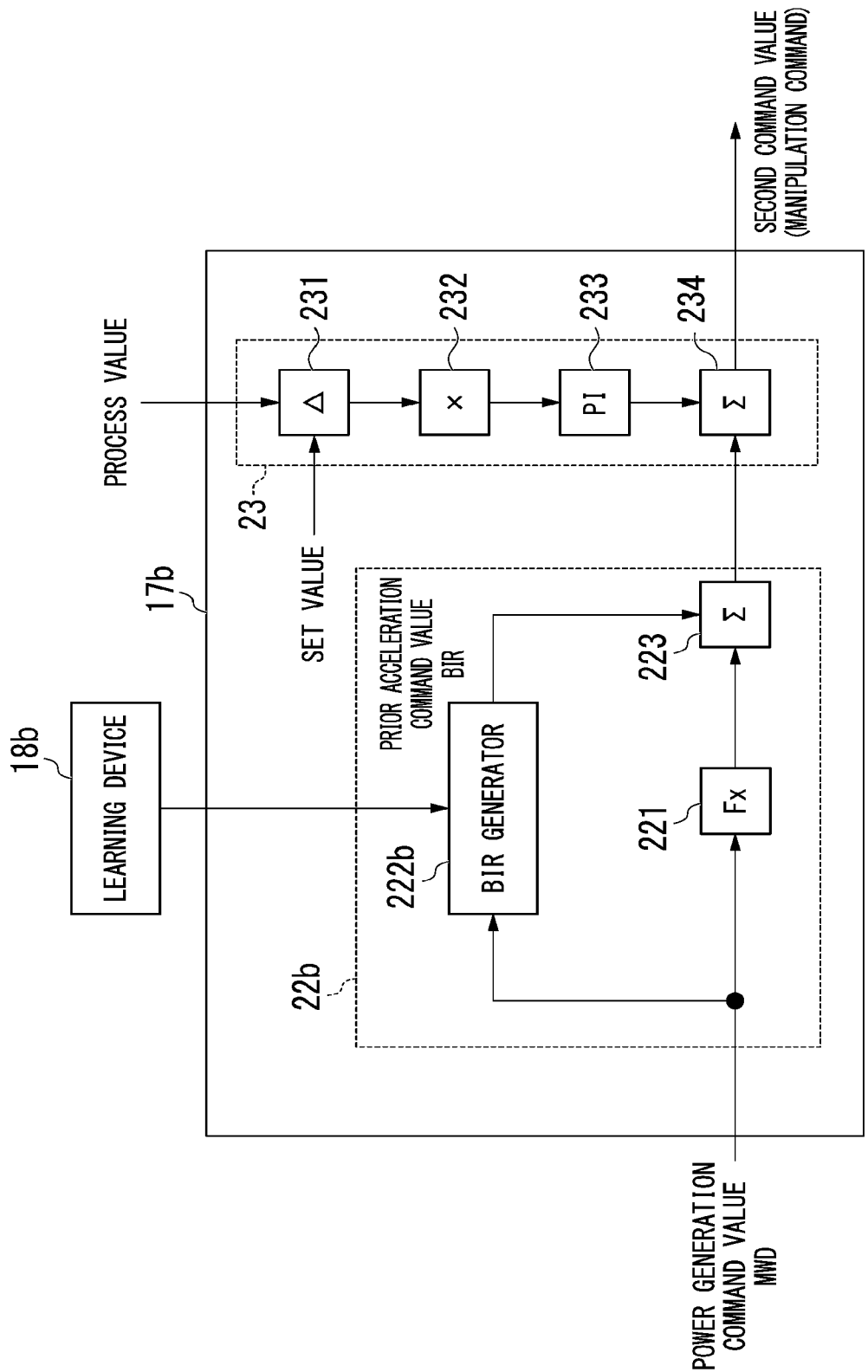
FIG. 8 is a functional block diagram of a boiler control device according to the second embodiment.

Next, functional blocks of the boiler control device 17*b* when the load on the boiler 3 according to the second embodiment is changed will be described with reference to FIG. 8. FIG. 8 is a functional block diagram of the boiler control device 17*b* according to the second embodiment.

As shown in FIG. 8, the boiler control device 17*b* includes a prior controller 22*b* and a feedback controller 23. Also, although an example in which the boiler control device 17*b* controls the fuel flow rate in advance will be described in the second embodiment, the example can be similarly applied to prior control for the main steam temperature, the water supply flow rate, the air flow rate, or the like. Also, functions of all or part of the above-described boiler control device 17*b* may be implemented by recording a program for implementing the functions in a computer in the above-described computer-readable recording medium and by causing the above-described processor to read and execute the above-described program recorded in the recording medium.

The prior controller 22*b* includes a function generator 221, a BIR generator 222*b*, and an adder 223.

The BIR generator 222*b* acquires a learning model (a learned model) constructed by the learning device 18*b* from the learning device 18*b*. For example, the BIR generator 222*b* reads the learning model stored in the learning model storage 21*b*. The BIR generator 222*b* optimizes the prior acceleration command value BIR using the read learning model in the control process. For example, in the control process, the BIR generator 222*b* inputs at least the power generation command value MWD obtained from an external device to the learning model as an input value and acquires the power generation quantity E as an output value from the learning model. The BIR generator 222*b* obtains the prior acceleration command value BIR in which a deviation between the power generation command value MWD (the input value) and the power generation quantity E (the output value) is minimized. However, the BIR generator 222*b* according to the present embodiment is not limited to the above embodiment and it is only necessary to obtain the prior acceleration command value BIR in which the deviation between the power generation command value MWD (the input value) and the power generation quantity E (the output value) is less than or equal to a preset threshold value even if the deviation is not minimized.

Here, in the learning process, when the learning data includes the process value, the BIR generator 222*b* may input, the power generation command value MWD and the process value obtained from the external device as input values in the control process to the learning model and acquire the power generation quantity E as an output value from the learning model. The BIR generator 222*b* may obtain the prior acceleration command value BIR in which the deviation between the power generation command value MWD (the input value) and the power generation quantity E (the output value) is minimized.

Also, it is desirable that the above-described prior acceleration command value BIR be obtained before the load on the boiler 3 changes.

The BIR generator 222*b* obtains the prior acceleration command value BIR using the learning model constructed by the learning device 18*b* and outputs the prior acceleration command value BIR to the adder 223.

The adder 223 generates a first command value by adding the fuel flow rate command value, which is output from the function generator 221, to the prior acceleration command value BIR output from the BIR generator 222*b*. The adder 223 outputs the generated first command value to the adder 234. The adder 234 generates a second command value by adding a control command, which is output from the PI controller 233, to the first command value output from the adder 223. The adder 234 outputs the second command value to a device for controlling the control target, for example, the fuel flow rate adjuster 7.

Figure 9A:
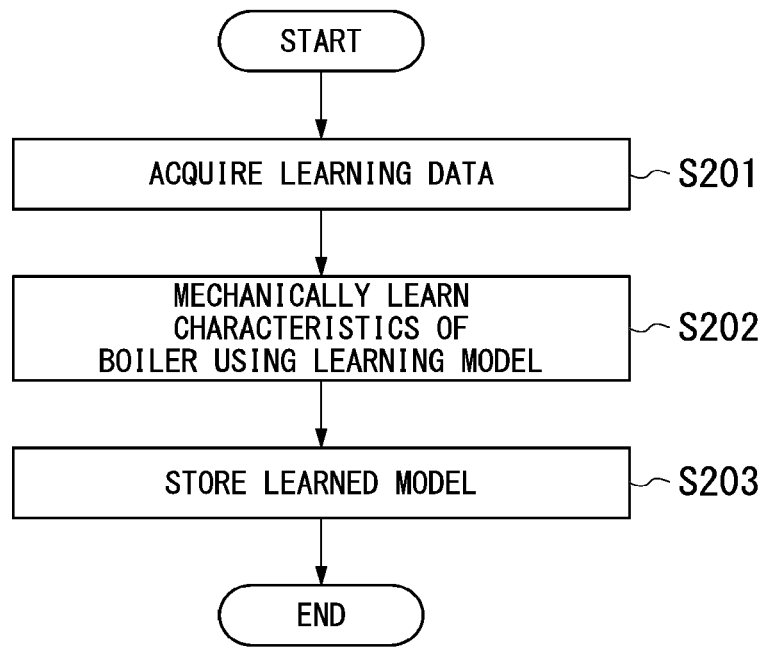
FIG. 9A is a flowchart of an example of an operation of the learning device according to the second embodiment.

An example of a flow of an operation of the learning device 18*b* according to the second embodiment will be described below with reference to FIG. 9A. FIG. 9A is a flowchart of an example of the operation of the learning device 18*b* according to the second embodiment.

First, the learning data acquisitor 19*b* acquires, as learning data, a data set including the power generation command value MWD, the prior acceleration command value BIR, and the power generation quantity E used in the previous operation of the boiler 3 (step S201).

Next, the learner 20*b* mechanically learns the characteristics of the boiler 3 using the learning model based on the learning data acquired by the learning data acquisitor 19*b*. For example, the learner 20*b* acquires an output value output from the learning model by inputting the power generation command value MWD and the prior acceleration command value BIR within the learning data as input values to the learning model. The learner 20*b* learns a parameter (a weight) of the learning model using, for example, the error backpropagation method, such that a deviation between the output value from the learning model and the power generation quantity E of the learning data is minimized (step S202).

The learner 20b stores the constructed learning model (learned model) in the learning model storage 21b (step S203).

Figure 9B:
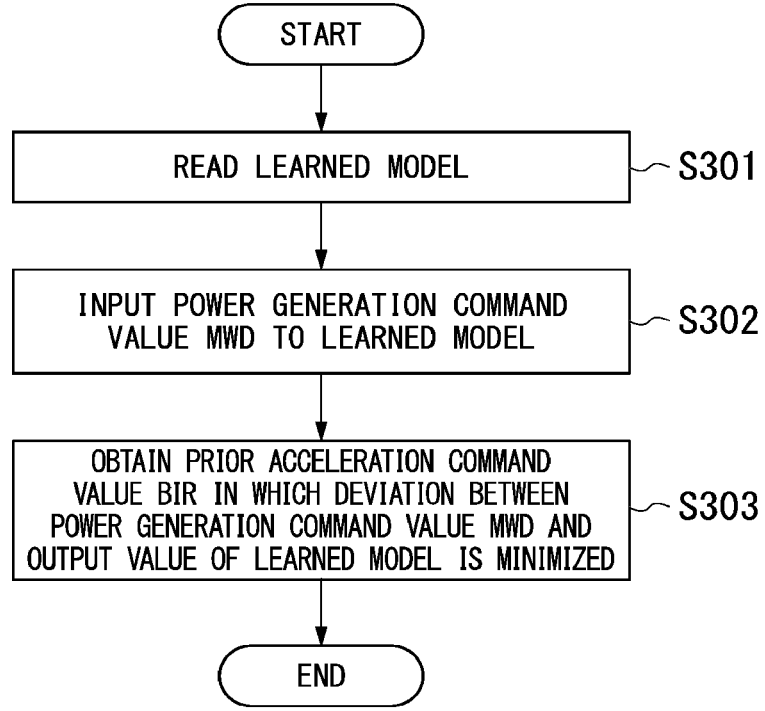
FIG. 9B is a flowchart of an example of an operation of a BM generator according to the second embodiment.

Next, an example of a method of generating the prior acceleration command value BIR of the BIR generator 222b according to the second embodiment will be described with reference to FIG. 9B. FIG. 9B is a flowchart of an example of an operation of the BIR generator 222b according to the second embodiment.

The BIR generator 222b reads, from the learning model storage 21b, a learned model which is a learning model constructed by the learning device 18b (step S301). Next, the BIR generator 222b inputs the power generation command value MWD, which is obtained from the external device, as an input value to the read learning model (learned model) before the load on the boiler 3 changes (step S302). The BIR generator 222b obtains the prior acceleration command value BIR in which a deviation between the output value, which is output from the learning model, and the power generation command value MWD, which is the input value, is minimized (step S303).

Here, in steps S302 and 303, the BIR generator 222b may input, as input values to the learning model, the power generation command value MWD and the process value obtained from the external device, and obtain the prior acceleration command value BIR in which the deviation between the output value, which is output from the learning model, and the power generation command value MWD of the input value is minimized.

As described above, the learning device 18b according to the second embodiment includes the learner 20b for constructing the learning model for generating the prior acceleration command value BIR for controlling the control target in advance of the time the load on the boiler 3 used for thermal power generation changes. The learner 20b generates the above-described learning model by mechanically learning, as learning data, a data set including the power generation command value MWD of the thermal power generation, the prior acceleration command value BIR, and the power generation quantity E used in the previous operation of the boiler 3.

More specifically, the learner 20b according to the second embodiment mechanically learns the characteristics of the boiler 3 by mechanically learning relationships between the power generation command value MWD, the prior acceleration command value BIR, and the power generation quantity E based on the learning data acquired by the learning data acquisitor 19b.

According to the above-described configuration, it is possible to generate a prior acceleration command value BIR in which the above-described tracking characteristic exceeds a given standard in a state in which the user does not set the prior acceleration command value BIR based on previous experience. For example, the boiler control device 17b can obtain the prior acceleration command value BIR in which the deviation between the power generation command value MWD input to the learned model, which is the learning model constructed by the learning device 18b, and the power generation quantity E output from the learned model is minimized. Therefore, it is possible to improve the tracking characteristic of the power generation quantity E with respect to the power generation command value MWD.

Further, the operation data in the actual operation using the prior acceleration command value BIR, which is obtained from the learning model of the second embodiment, is utilized as the learning data. That is, the learning model is updated by the learner 20b based on the latest operation data and the power generation quantity E. As a result, the learning device 18b can accurately generate the prior acceleration command value BIR in which the above-described tracking characteristic exceeds a given standard when the actual operation is performed.

Although embodiments of the present disclosure have been described above with reference to the drawings, specific configurations are not limited to the embodiments, and other designs and the like may also be included without departing from the scope of the present disclosure.

(Modified example 1) Although an example in which the boiler 3 is a pulverized coal-fired boiler configured to burn pulverized coal as fuel has been described in the above-described first and second embodiments, the present disclosure is not limited thereto. For example, the boiler 3 may be a mixed combustion boiler that uses ammonia fuel in addition to fossil fuel as fuel and performs mixed combustion of the fossil fuel and ammonia fuel.

(Modified example 2) In the above-described first and second embodiments, the prior acceleration command value BIR may be, for example, any of the items listed below.

Command value of main steam pressure
Command value of fuel flow rate
Command value of exhaust gas $O_2$
Command value of degree of opening of gas damper for controlling reheated steam temperature
Command value of intermediate degree of spray opening
Command value of air flow rate for two-stage combustion
Command value of ammonia control for denitration Also, all or part of the learning device of the above-described first or second embodiment may be implemented by a computer. In this case, the above-described computer may include a processor such as a CPU or a GPU and a computer-readable recording medium. Functions of all or part of the above-described learning device may be implemented by recording a program for implementing the functions in the computer in the above-described computer-readable recording medium and causing the above-described processor to read and execute the above-described program recorded in the recording medium. Here, the "computer-readable recording medium" refers to a storage device including a flexible disk, a magneto-optical disc, a ROM, a portable medium such as a compact disc (CD)-ROM, and a hard disk embedded in the computer system. Further, the "computer-readable recording medium" may include a computer-readable recording medium for dynamically retaining a program for a short time as in a communication line when the program is transmitted via a network such as the Internet or a communication circuit such as a telephone circuit. The "computer-readable recording medium" may include a computer-readable recording medium for retaining the program for a given time period as in a volatile memory inside the computer system including a server and a client when the program is transmitted. Also, the above-described program may be a program for implementing some of the above-described functions. Further, the above-described program may be a program capable of implementing the above-described functions in combination with a program already recorded on the computer system or may be a program that is implemented using a programmable logic device such as an FPGA.

INDUSTRIAL APPLICABILITY

The present disclosure can be used for a learning device for constructing a learning model for generating a prior acceleration command value for controlling a control target in advance of the time a load on a boiler used for thermal power generation changes, and can be used for a boiler control system including the learning device.

REFERENCE SYMBOLS

A, B Thermal power generation system
1 Thermal power generation plant
2, 2b Plant control system
3 Boiler
17, 17b Boiler control device
18, 18b Learning device
20, 20b Learner

The invention claimed is:

1. A learning device for constructing a learning model for generating a prior acceleration command value for controlling a control target in advance of the time a load on a boiler used for thermal power generation changes, the learning device comprising:
a microprocessor or a microcontroller configured to generate the learning model by mechanically learning, as learning data, a data set including a power generation command value for the thermal power generation and the prior acceleration command value which have been used in a previous operation of the boiler,
wherein the microprocessor or the microcontroller constructs, based on the learning data, the learning model which, by at least the power generation command value being input, outputs the prior acceleration command value in which a tracking characteristic of a power generation quantity with respect to the power generation command value exceeds a given standard.

2. The learning device according to claim 1, wherein the microprocessor or the microcontroller causes a process value of the control target obtained in the previous operation of the boiler to be included in the learning data.

3. The learning device according to claim 2, wherein the process value of the control target includes one or more of a flow rate of fuel supplied to the boiler, a flow rate of water supplied to the boiler, a flow rate of air supplied to the boiler, a flow rate of ammonia for denitration, a flow rate of spray for controlling reheated steam temperature, and steam pressure.

4. The learning device according to claim 1, wherein the microprocessor or the microcontroller uses, as the learning data, the data set obtained in the previous operation of the boiler.

5. The learning device according to claim 1, wherein the microprocessor or the microcontroller causes a power generation quantity of the thermal power generation obtained in the previous operation of the boiler to be included in the data set.

6. The learning device according to claim 5, wherein the microprocessor or the microcontroller constructs, based on the learning data, the learning model which, by at least the power generation command value and the prior acceleration command value being input, outputs the power generation quantity.

7. A boiler control system comprising:
the learning device according to claim 1; and
the microprocessor or the microcontroller configured to obtain the prior acceleration command value by inputting at least the power generation command value to a learned model which is the learning model constructed by the learning device,
wherein, when the load on the boiler changes, the microprocessor or the microcontroller causes the power generation quantity to track the power generation command value by controlling the control target based on a value obtained by adding the prior acceleration command value to the power generation command value.

8. A boiler control system comprising:
the learning device according to claim 6; and
the microprocessor or the microcontroller configured to obtain the power generation quantity by inputting at least the power generation command value to a learned model which is the learning model constructed by the learning device,
wherein the microprocessor or the microcontroller obtains the prior acceleration command value in which a deviation between the power generation command value input to the learned model and the power generation quantity output from the learned model is minimized.

* * * * *